Dec. 7, 1954  W. G. JARVIS  2,696,238
ANTISKIDDING DEVICE FOR MOTOR VEHICLE TIRES
Filed Feb. 8, 1952
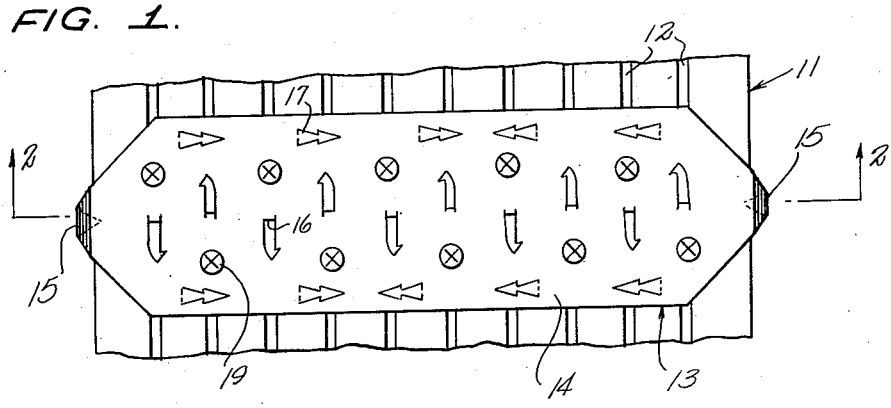
FIG. 1.
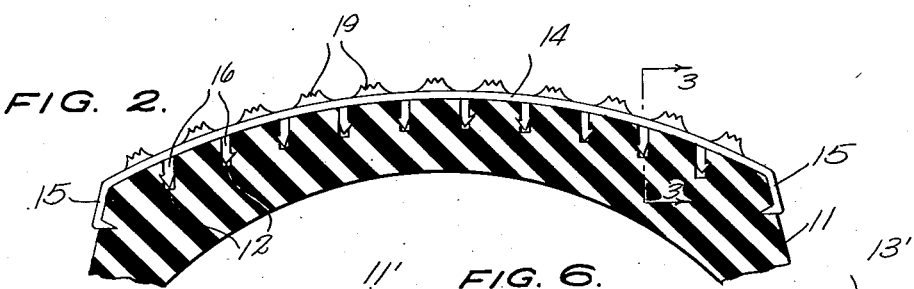
FIG. 2.
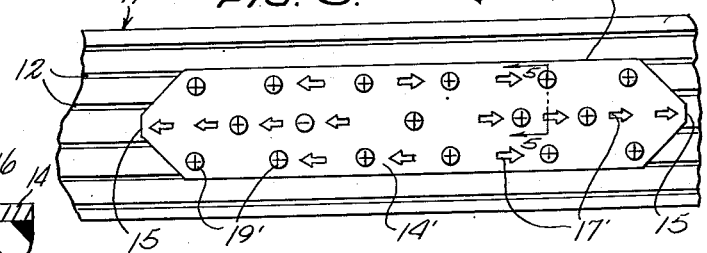
FIG. 6.
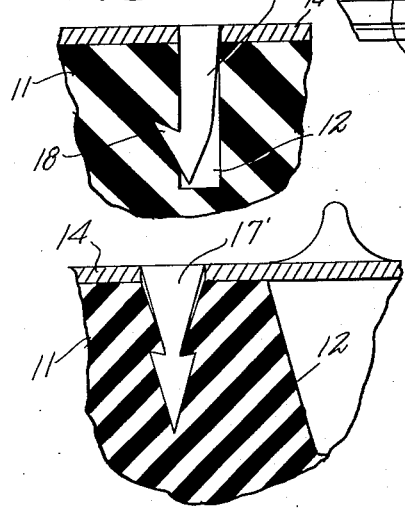
FIG. 4.
FIG. 5.
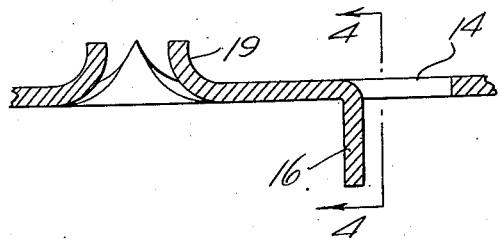
FIG. 3.
INVENTOR
WILFRED G. JARVIS,
BY
McMorrow, Berman + Davidson
ATTORNEYS

United States Patent Office 2,696,238
Patented Dec. 7, 1954

2,696,238

ANTISKIDDING DEVICE FOR MOTOR VEHICLE TIRES

Wilfred G. Jarvis, Glencoe, Minn.

Application February 8, 1952, Serial No. 270,624

3 Claims. (Cl. 152—230)

This invention relates to friction tread devices for motor vehicle tires, and more particularly to an improved friction shoe for attachment to the tread of an automobile tire to prevent the skidding of the tire on icy pavements and the like.

The main object of the invention is to provide a novel and improved anti-skidding device for an automobile tire, said device being simple in construction, being easy to install on a tire, and requiring no modification of the tire.

A further object of the invention is to provide an improved friction shoe for automobile tires of the type having longitudinally grooved treads, the improved shoe device being inexpensive to fabricate, being easy to install, being durable in construction, and serving effectively to prevent the tire from skidding or slipping on icy or other smooth road surfaces.

Further objects and advantages of the invention will become apparent from the following description and claims and from the accompanying drawings, wherein:

Figure 1 is a fragmentary plan view of a portion of the tread of an automobile tire showing an improved friction shoe device according to the present invention installed thereon and arranged transverse to the longitudinal grooves of the tread.

Figure 2 is a cross sectional view taken on the line 2—2 of Figure 1.

Figure 3 is an enlarged cross sectional detail view taken on the line 3—3 of Figure 2.

Figure 4 is a cross sectional detail view taken on the line 4—4 of Figure 3.

Figure 5 is an enlarged cross sectional detail view taken on the line 5—5 of Figure 6.

Figure 6 is a fragmentary plan view of a portion of a vehicle tire tread showing an improved shoe device according to the present invention mounted on the tread and extending longitudinally thereon.

Referring to the drawings, and more particularly to Figures 1 to 4, 11 designates a tire having the longitudinal grooves 12 in its tread surface. Designated at 13 is a friction shoe comprising a body of malleable sheet metal 14 of elongated shape, as shown in Figure 1, said body being adapted to be positioned transversely over the tread of the tire 11, and the body being formed at its ends with the respective depending inturned hook elements 15, 15 adapted to be embedded in the opposite sides of the tread of the tire, as shown in Figure 2. The body 14 is arcuately curved to conform with the curvature of the tire tread and is formed with the spaced hook elements 16 struck downwardly from the body, the spacing of the hook elements 16 being the same as the spacing between the longitudinal grooves 12 of the tire tread, whereby the hook elements 16 engage in said grooves and become lodged in the side walls of the grooves, as shown in Figure 2, thus securing the body 14 to the tread surface. The body 14 is further formed with the downstruck barbed prongs 17 spaced so as to engage the tire tread between respective adjacent pairs of grooves 12, 12 to provide further securement of the body 14 to the tire tread. As shown in Figure 5, the barbed prongs 17 are embedded in the tire tread and thus secure the body 14 against separation from the tread. As shown in Figure 4, the hook elements 16 are formed with the laterally directed spurs 18 which penetrate into the side walls of the grooves 12.

As shown in Figure 1, the hook elements 16 are disposed along the longitudinal center line of the body 14, and the barbed prongs 17 are arranged in rows disposed symmetrically on opposite sides of the longitudinal center line of the body 14 and located adjacent the side margins of said body.

The body 14 is formed with a plurality of calks 19 struck upwardly from the body and defining gripping elements for increasing the traction of the tire on which the device is mounted. As shown in Figure 1, the calks 19 may be arranged alternately on opposite sides of the longitudinal center line of the body 14 in staggered relationship with respect to each other.

Referring to the form of the invention shown in Figure 6, the friction shoe is designated generally at 13' and comprises an elongated body 14' of flat malleable sheet material adapted to be disposed longitudinally on the tire tread, the body being formed at its opposite ends with the elements 15 adapted to be embedded in the tread of the tire, shown at 11', and being formed along its longitudinal center line and along its side margins with the spaced downstruck prongs 17' and upstruck calks 19'. The prongs 17' are spaced so as to engage in the tread of the tire between adjacent grooves 12, 12 thereof. The hook members 15, 15 become embedded in the tread of the tire after the shoe member 13' has been placed on the tire in the manner shown in Figure 6, and after the tire has made a few revolutions in contact with the ground. The prongs 17' likewise become firmly embedded in the tire tread after the tire has rolled on the ground for a short time.

While certain specific embodiments of an improved friction shoe device for motor vehicle tires have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination with a vehicle tire of the type having a circumferentially grooved tread, a friction shoe engaged on the tread comprising a body of malleable sheet metal, a plurality of flat hook elements struck down from said body in alignment with and received in the grooves of said tread, said hook elements having laterally directed barbs engaged in the walls of the grooves and a plurality of calks struck upwardly from said body and defining gripping elements for increasing the traction of said tread.

2. In combination with a vehicle tire of the type having a circumferentially grooved tread, a friction shoe engaged on the tread comprising an elongated body of malleable sheet metal disposed transversely across said tread, a plurality of longitudinally spaced flat hook elements struck down from said body in alignment with and received in the grooves of said tread, said hook elements having laterally directed barbs engaged in the walls of the grooves, a plurality of barbed prongs struck down from said body and embedded in said tread between the grooves thereof, and a plurality of calks struck upwardly from said body and defining gripping elements for increasing the traction of said tread.

3. In combination with a vehicle tire of the type having a circumferentially grooved tread, a friction shoe engaged on the tread comprising an elongated body of malleable sheet metal disposed transverse across said tread, a plurality of longitudinally spaced flat hook elements struck down from said body aligned with and received in the grooves of said tread, said hook elements having laterally directed barbs engaged in the walls of the grooves, a plurality of barbed prongs struck down from said body and embedded in said tread between the grooves thereof, a plurality of calks struck upwardly from said body and defining gripping elements for increasing the traction of said tread, and respective depending inturned hook elements at the ends of said body embedded in the opposite side edges of said tread.

(References on following page)

References Cited in the file of this patent

UNITED STATES PATENTS

| Number | Name | Date |
|---|---|---|
| 859,856 | Titus | July 9, 1907 |
| 862,412 | Partridge | Aug. 6, 1907 |
| 1,262,011 | Bruce | Apr. 9, 1918 |
| 1,609,464 | Compton | Dec. 7, 1926 |
| 2,488,427 | Morrone | Nov. 15, 1949 |
| 2,530,108 | Whichard | Nov. 14, 1950 |

FOREIGN PATENTS

| Number | Country | Date |
|---|---|---|
| 410,883 | Italy | June 14, 1945 |